Nov. 20, 1928.  
W. J. FIEGEL  
1,692,204  
CLAMP FOR MOLDING MACHINES  
Filed Oct. 11, 1926  
2 Sheets-Sheet 1

INVENTOR.  
William J. Fiegel  
BY  
ATTORNEYS

Nov. 20, 1928.
W. J. FIEGEL
1,692,204
CLAMP FOR MOLDING MACHINES
Filed Oct. 11, 1926    2 Sheets-Sheet 2
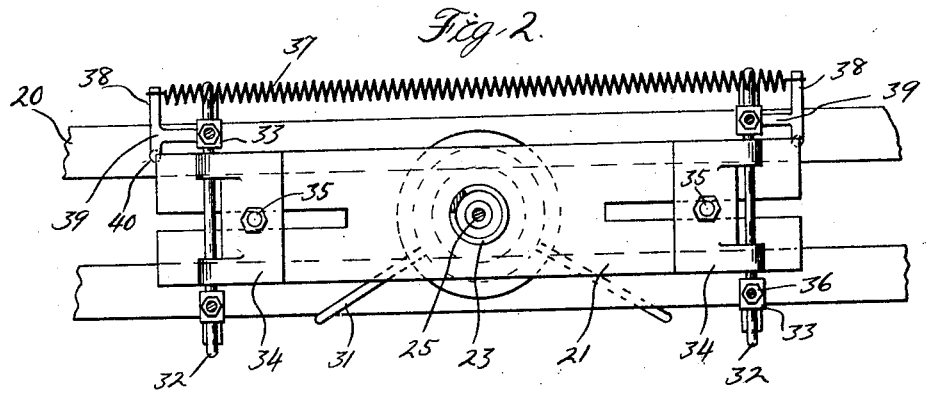
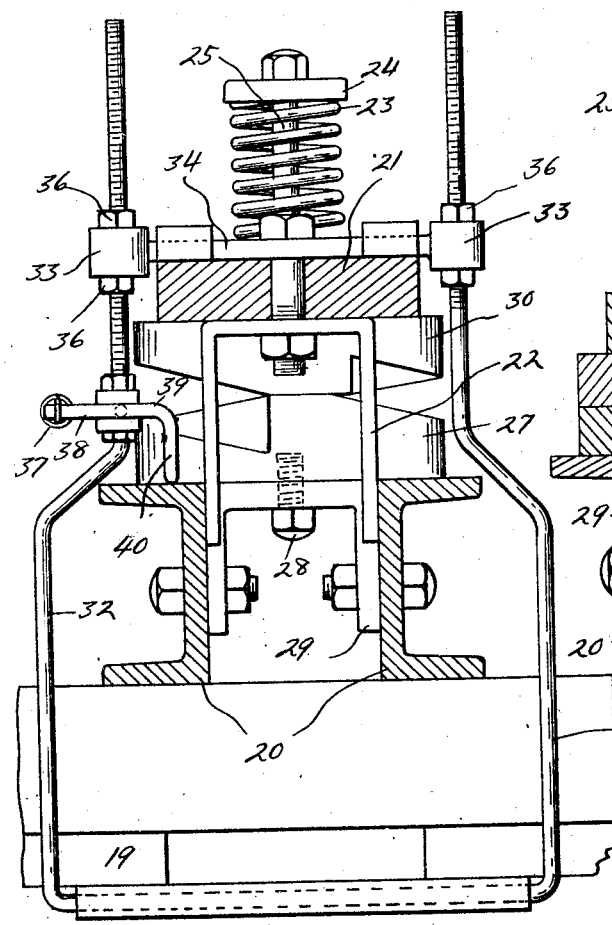
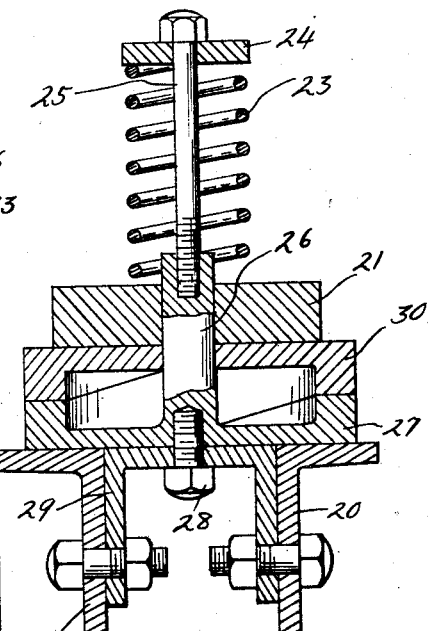
INVENTOR.
William J. Fiegel
BY
ATTORNEYS Patented Nov. 20, 1928.

1,692,204

UNITED STATES PATENT OFFICE.

WILLIAM J. FIEGEL, OF DETROIT, MICHIGAN, ASSIGNOR TO BOHN ALUMINUM & BRASS CORPORATION, OF DETROIT, MICHIGAN, A CORPORATION OF MICHIGAN.

CLAMP FOR MOLDING MACHINES.

Application filed October 11, 1926. Serial No. 140,948.

This invention relates to molding machines and more particularly to a clamping mechanism for use in connection with such machines for holding one of the mold parts during the drawing of the mold.

The invention has as one of its objects to provide a construction of this character which will, in a simple but effective manner, grasp one of the mold parts, for instance, the pattern plate, prior to the drawing operation to hold the same during that period in which the flask is being withdrawn. Heretofore devices of a more or less complicated nature have been employed which have been difficult to operate and have been otherwise inefficient and unreliable.

The present invention contemplates a pair of mold-engaging elements supported upon a cross head adjustably mounted upon the frame of a molding machine, means being provided for normally urging the mold part-engaging elements into operative position and additional means being provided for automatically moving these elements to inoperative or releasing position in one position of the cross head. As a consequence of this, the mold part is automatically engaged as the cross head is adjusted to one of the positions, whereupon the mold part is supported and clamped against the frame of the molding machine. When the cross head is adjusted to its other position, the mold part engaging elements are moved to inoperative position to release the mold part, whereupon it may be removed or otherwise handled with reference to the molding machine without interference.

The invention also contemplates means associated with the valve controlling the power to the ram, whereupon the valve is arrested in an intermediate position so selected that the ram descends, during the drawing operation, at a predetermined retarded speed without any attention on the part of the operator.

The various objects, advantages and novel details of construction of the invention will be made more apparent as this description proceeds, especially where considered in connection with the accompanying drawings wherein Figure 1 is an elevational view of a molding machine constructed in accordance with this invention;

Figure 3 is a fragmentary vertical sectional view taken substantially on the plane indicated by line 3—3 of Figure 1;

Figure 4 is a detail sectional view taken on a plane indicated by line 4—4 of Figure 1.

Figures 2, 5:
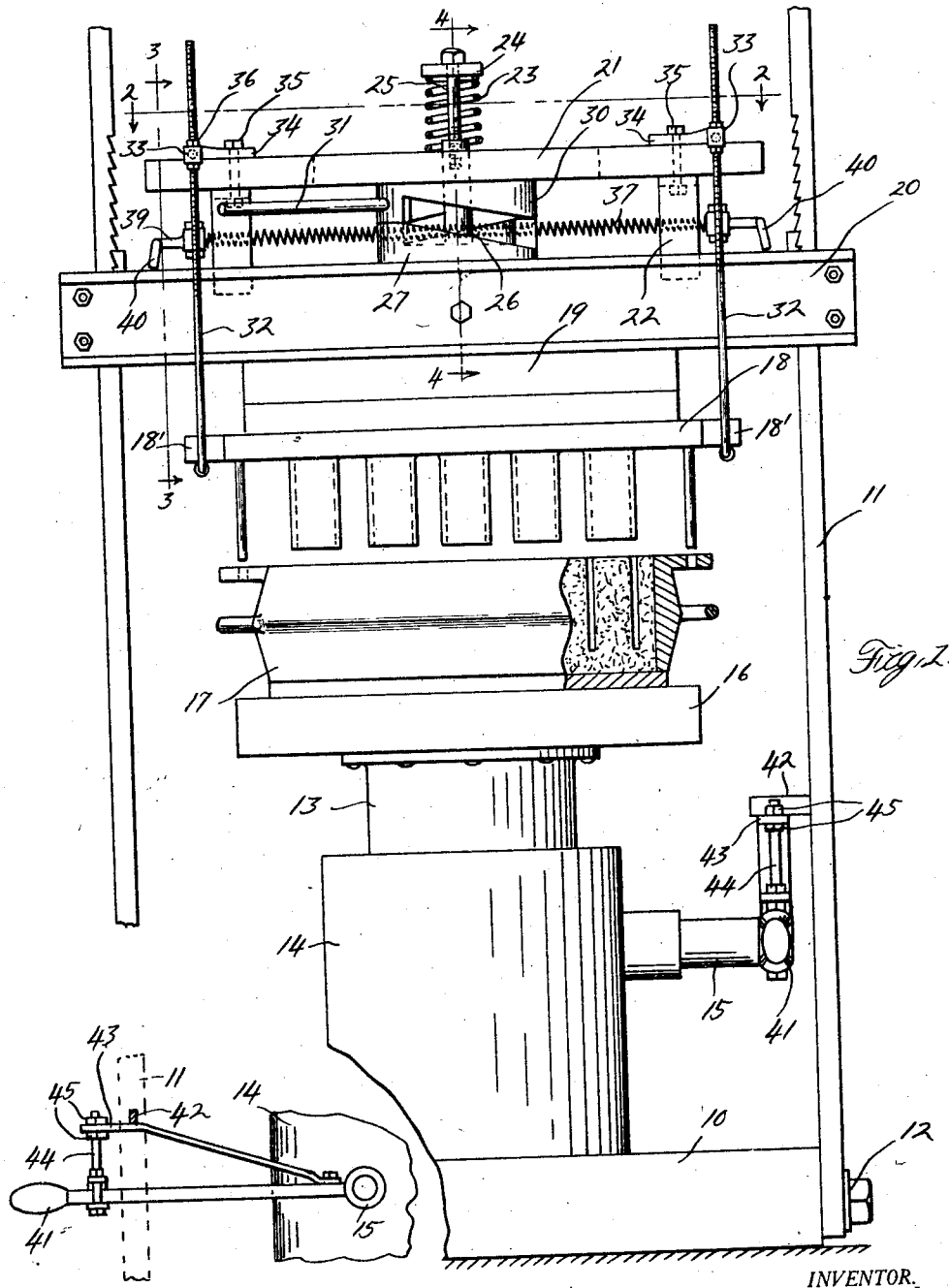
Figure 2 is a horizontal sectional view taken substantially on the plane indicated by line 2—2 of Figure 1.
Figure 5 is a fragmentary view, partly in elevation and partly in section, of the valve control arresting means.

Referring now particularly to the drawings wherein like reference characters indicate like parts, it will be noted that the molding machine includes a base 10 and a pair of swinging side frame members 11 pivotally connected as at 12 to the base 10. A ram 13 reciprocates in a housing 14 by power, such as air pressure, controlled by a suitable valve indicated generally by reference character 15. The ram 13 carries a plate 16 upon which the flask 17 of the mold is adapted to rest. The reference character 18 indicates generally the pattern plate and 19 the squeezer plate which is carried by the frame member 20 of the molding machine. This latter frame member is supported upon the side frame members 11.

One of the important objects of this invention is to provide simple but effective means of engaging the pattern plate 18 during the drawing operation and for this purpose I provide a cross head or like member 21 which is mounted upon the frame members 20 in such a manner as to be capable of vertical adjustment. This cross head 21, as seen more particularly in Figures 1 and 3, is provided with vertically extending guides 22, which extend between the spaced frame members 20 to thus guidingly support the cross head 21. The cross head is normally urged in a downward direction by means of a spring 23, which engages on the one hand against the cross head and on the other hand against an abutment plate 24 secured in place by a bolt 25, the other end of which has a threaded engagement with the stud 26 projecting upwardly from a cam or wedge member 27. This cam member is secured by means of a bolt 28 to a bracket 29 fixed to the frame members 20. Cooperating with the cam member 27 is a complementary cam member 30, this latter member being rotatable about the stud 26 by means of a handle 31. In this manner the cross head 21 may be raised against the tension of the spring 23 by rotating the cam member 30 from the position shown in Figure 4 to that shown in Figure 1. This upward movement of the cross head moves the clamping elements, yet to be described, into operative position in a manner also yet to be more fully referred to.

The reference character 32 indicates a pair of mold part-engaging elements or clamps, which are preferably substantially U-shaped in cross section with the upper ends thereof arranged for engagement with apertured enlargements 33 of brackets or pivot members 34, these latter being secured, as, for instance, by means of bolts 35, to cross head 21. Lock nuts 36 may be provided by means of which the clamps may be adjusted and secured in their adjusted position.

The mounting of the clamping elements 32 permit the same to be rocked or swung about a horizontal axis so that the lower looped ends of these clamps may be engaged under extensions 18' on the pattern plate 18. The clamps are normally urged into operative or engaging position, as, for instance, by means of a spring 37 connected at its ends to arms 38 of brackets 39 secured to one leg of each of the U-shaped clamps (see particularly Figures 2 and 3). Another leg 40 of the brackets 39 is extended in a downward direction for engagement with the adjacent face of the frame member 20 and has a camming action therewith in the following manner: When the handle 31 is operated to rotate the cam member 30 to permit cross head 21 to descend under the action of spring 23, the legs 40 of the brackets 39 bear upon the upper face of the adjacent frame member at an angle slightly inclined to the vertical, so that as the cross head, and consequently the clamping members, are forcibly urged toward the frame members 20, the engagement of the legs 40 will forcibly swing the clamping members about their pivots and in an outward direction so as to release the pattern plate 18. Obviously when the handle 31 is subsequently rotated to raise the cross head, the arms 40 will be raised clear of the frame members 20, and the relatively weak spring 37 will then swing the clamping members into a substantially vertical position wherein they engage under the extensions 18' of the pattern plate.

The valve 15, which controls the power for operating the ram 13, is operated by means of a handle 41. It is desirable to arrest the handle and consequently the control valves in a position where the air, if compressed air is used, is permitted to escape slowly so that the ram 13 will descend slowly. For this purpose I provide preferably on one of the frame members 11 a lug or stop 42 with which a stop 43 on the handle 41 is adapted to engage. This stop is adjustable by means, for instance, of a bolt 44 projecting upwardly from a handle 41, which is passed through an aperture in the extension 43 and adjustably secured thereto by means of a pair of lock nuts 45. If it is understood that the handle 41 is swung in an upward direction to close the valve controlling the escape of the fluid from under the ram 13, it will be seen that the engagement of the adjustable stop 43 with the fixed stop 42 will hold the handle 41 and, as a consequence the valve, in a position where it is open only to a limited extent. This has heretofore been accomplished manually, with the result that the operator had to hold the handle 41 in the desired position until the ram had completely descended. By this mechanism the valve will be held in the desired position without any attention on the part of the operator and the extent to which the valve is held open may be governed by regulating the position of the adjustable stop 43.

The operation of the herein described construction will no doubt be readily apparent without further detailed description of the same. One embodiment of the invention has been described and illustrated herein somewhat in detail, but it will be immediately apparent to those skilled in this art that various changes in many of the essential and all of the non-essential details of the invention may be resorted to without departing from the spirit and scope thereof, and to this end reservation is made to make such changes as may come within the perview of the accompanying claims.

What I claim as my invention is:

1. The combination with a molding machine and mold part, of a clamping mechanism for said mold part including an adjustable cross head, a pair of clamping elements swingingly mounted on said cross head, means normally urging said clamping elements into operative position, means automatically operable in one direction of movement of the cross head for moving said clamping elements to inoperative position, and means for adjusting said cross head to permit said clamping elements to engage said mold part to support the same.

2. The combination with a molding machine and mold part, of a clamping mechanism for said mold part including an adjustable cross head, a pair of clamping elements swingingly mounted on said cross head, means normally urging said clamping elements into operative position, means on said clamping elements having a camming engagement with the frame of the machine for moving said elements to inoperative position in one position of said cross head, and means for adjusting said cross head to permit said clamping elements to engage said mold part to support the same.

3. In combination, a molding machine including a frame and a mold part, a cross head adjustably mounted on said frame, a pair of mold part engaging elements swingingly mounted on said cross head, means automatically operable in one direction of movement of the cross head for moving said elements to inoperative position, and means for adjusting said cross head to cause said elements to engage and support said mold part.

4. In combination, a molding machine including a frame and a mold part, a cross head adjustably mounted on said frame, a pair of mold part engaging elements swingingly mounted on said cross head, means automatically operable upon movement of the cross head for moving said elements to inoperative position, means for moving said elements to operative positon, and means for adjusting said cross head to cause said elements to engage and support said mold part.

5. The combination with the frame of a molding machine and a mold part, of a cross head, a pair of U-shaped clamps pivotally mounted on said cross head and adapted to engage said mold part to clamp the same against said frame, means normally urging said clamps into operative position, means on said clamps engaging said frame in one position of said cross head for automatically moving said clamps into inoperative position, and means for adjusting said cross head to cause said clamps to engage said mold part to clamp the same against said frame.

6. The combination with the frame of a molding machine and a mold part, of a cross head, a pair of U-shaped clamps pivotally mounted on said cross head and adapted to engage said mold part to clamp the same against said frame, springs normally urging said clamps into operative position, cam members on said clamps engaging said frame in one position of said cross head for moving said clamps into inoperative position, and means for adjusting said cross head to cause said clamps to engage said mold part to clamp the same against said frame.

7. The combination with the frame of a molding machine and a mold part, of a cross head, a pair of U-shaped clamps pivotally mounted on said cross head and adapted to engage said mold part to clamp the same against said frame, means normally urging said clamps into operative position, means on said clamps engaging said frame in one position of said cross head for automatically moving said clamps into inoperative position, and cam means for adjusting said cross head to cause said clamps to engage said mold part to clamp the same against said frame.

8. The combination with the frame of a molding machine and a mold part, of a cross head, a pair of adjustably mounted U-shaped clamps pivotally mounted on said cross head and adapted to engage said mold part to clamp the same against said frame, means normally urging said clamps into operative position, means on said clamps engaging said frame in one position of said cross head for automatically moving said clamps into inoperative position, and means for adjusting said cross head to cause said clamps to engage said mold part to clamp the same against said frame.

9. The combination with the frame of a molding machine and a mold part, of a cross head, a pair of adjustably mounted U-shaped clamps pivotally mounted on said cross head and adapted to engage said mold part to clamp the same against said frame, springs normally urging said clamps into operative position, cam members on said clamps engaging said frame in one position of said cross head for moving said clamps into inoperative position, and cam means for adjusting said cross head to cause said clamps to engage said mold part to clamp the same against said frame.

In testimony whereof I affix my signature.

WILLIAM J. FIEGEL.